(No Model.)
C. W. HUNT.
CONVEYER.
No. 466,043.  Patented Dec. 29, 1891.
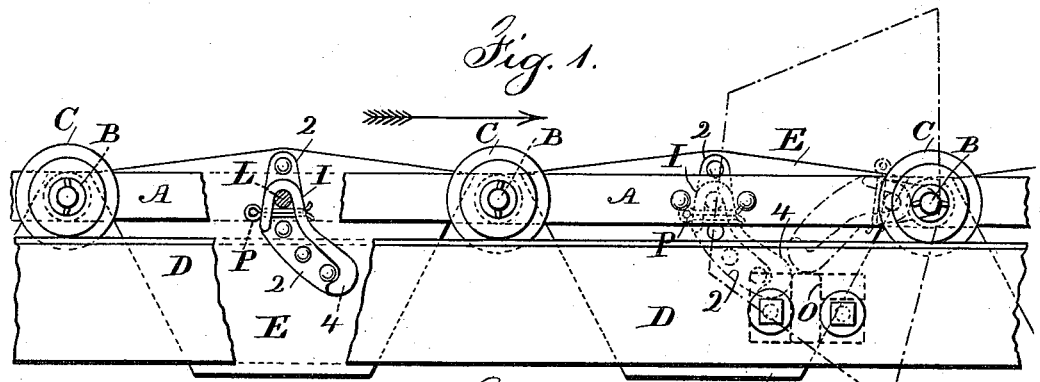
Fig. 1.
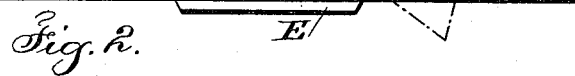
Fig. 2.
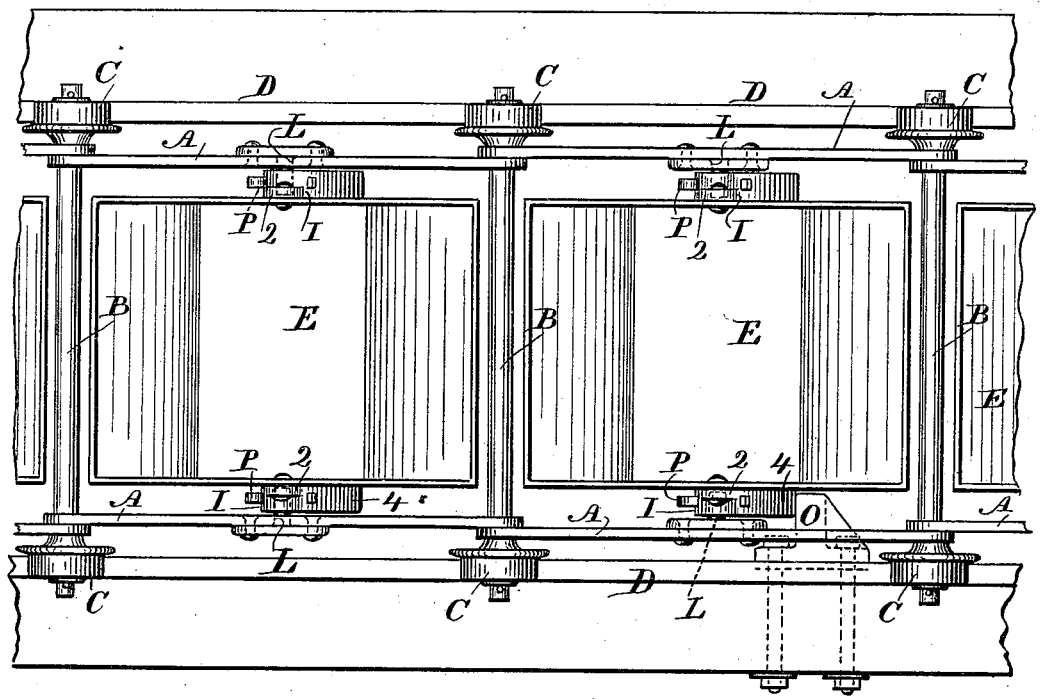
Witnesses
Chas. H. Smith
J. Staib
Inventor
Charles W. Hunt
per Lemuel W. Serrell
atty

UNITED STATES PATENT OFFICE.

CHARLES W. HUNT, OF WEST NEW BRIGHTON, NEW YORK.

CONVEYER.

SPECIFICATION forming part of Letters Patent No. 466,043, dated December 29, 1891.

Application filed July 9, 1891. Serial No. 398,900. (No model.)

*To all whom it may concern:*

Be it known that I, CHARLES W. HUNT, a citizen of the United States, residing at West New Brighton, in the county of Richmond and State of New York, have invented an Improvement in Conveyers, of which the following is a specification.

Conveyers have been made in which the buckets are connected together by chains and supported by wheels upon tracks, so that such conveyer-buckets can be drawn along from the place of reception of the coal or other material to the place of delivery and tipped or swung upon pivots for discharging the contents. These buckets are exposed to more or less concussion, and they are liable to become bent or injured, and to remove the buckets for repairs it has usually been necessary to uncouple the chains and disconnect the parts of the elevator to a considerable extent.

My present improvement is made for the purpose of allowing the speedy removal of any bucket from its position in the conveyer-chain without disconnecting the parts of such chain, thus facilitating repairs and allowing one bucket to be taken out and another one introduced almost at will.

In the drawings, Figure 1 is a side view, partly in section, of the parts of a chain conveyer, representing the improved bucket in position; and Fig. 2 is a plan view.

The chains A, cross shafts or axles B for connecting the links of the chains, and the supporting wheels or rollers C form a series of quadrangular frames supported by the wheels. The cross shafts or axles serve as connections between the chains and keep the chains at the proper distances apart, and the buckets are within the quadrangular openings, and the rollers or wheels C travel upon tracks or supports D. The buckets E are pivoted so as to hang by gravity, as my present invention is limited to this class of gravity-buckets, and the bearings or supporting-pivots for connecting the gravity-buckets with the chains of the conveyer are separable, so that any bucket can be lifted out from between the chains without separating the chain connections.

The separable bearings between the gravity-buckets and the chains are preferably made in the form of open loops I, receiving the circular pivots L, so that the pivots are free to turn in the open loops; but it is necessary to provide a pin P or closure for the separable bearing. I find it advantageous to place the open loops I upon the buckets and the circular pivots L upon the links of the chain; but the position might be reversed, and by providing the pivots L upon the links and the separable bearings upon the buckets either bucket can be removed by simply withdrawing the pins or closures P to open the separable bearings for the bucket. It is advantageous to make the loops I in the form of projecting flanges from the plates 2, riveted to the ends of the bucket, and to perforate these loops for the pins or closures P, such pins being secured in any suitable manner. In discharging the contents of these gravity-buckets they require to be swung from a horizontal to a vertical position, to accomplish which I find it advantageous to employ the tipping-stop 4 upon the bucket at one side thereof, and this stop 4 is in advance of and below the pivot, and I provide a suitable stationary or adjustable stop O, against which the tipping-stop is arrested as the bucket and conveyer move along together, and the pivots of the bucket continuing to move the bucket is tipped and assumes a vertical position, as indicated by dotted lines in Fig. 1, before the stop 4 separates from the stop O, and during this operation the bucket has been rotated about ninety degrees and the contents discharged, and the stop 4 draws off above the stop O and the bucket swings back to its normal position. I find it advantageous to continue the loop I at one side in the form of a downward and forwardly projecting flange to form the tipping-stop 4, such flange being upon the plate riveted to the side of the bucket, thereby strengthening both the separable bearing and the tipping-stop.

I am aware that buckets and cars have been provided with loops by which they are lifted through the agency of endless chains; but they are not adapted to use as horizontal or nearly horizontal conveyers.

I claim as my invention—

1. The combination, with the buckets and the chains in a conveyer and the cross-axles connecting such chains, of separable bearings for attaching the gravity-buckets to the chains, whereby the buckets can be removed by opening the separable bearings without disconnecting the chains, substantially as set forth.

2. The combination, with the gravity-buckets, and the chains and supporting-rollers, and the cross-axles for the rollers connecting the chains and forming a conveyer, of pivots, and separable bearings for the pivots, whereby the buckets can be removed by opening the separable bearings for the pivots, substantially as set forth.

3. The combination, with the chains and supporting wheels and axles extending across and connecting the chains in a conveying apparatus, of buckets, pivots at opposite sides of the buckets, open loops forming bearings for the pivots, and removable closures for the open loops, substantially as set forth.

4. The combination, with the buckets and chains and the cross shafts or axles between the chains in a conveyer, of pivots at opposite sides of the gravity-buckets between the chain links and the buckets, and open loops to the pivots, and removable pins passing through holes in the open loops, substantially as set forth.

5. The combination, in a conveyer apparatus, of the chains, the gravity-buckets, pivots upon which such gravity-buckets swing, open loops for the pivots, one of which loops of each bucket is extended downward and forward to form the tipping-stop, and the plates connected with the loops, and tipping-stops riveted to the buckets, and a stationary stop with which the tipping-stops come in contact, substantially as set forth.

Signed by me this 6th day of July, 1891.

CHAS. W. HUNT.

Witnesses:
GEO. T. PINCKNEY,
WILLIAM G. MOTT.